(12) United States Patent
Rice

(10) Patent No.: US 7,233,464 B2
(45) Date of Patent: Jun. 19, 2007

(54) APPARATUS FOR AND METHOD OF GROUND FAULT DETECTION

(75) Inventor: Kevin Edward Rice, Stow, OH (US)

(73) Assignee: Goodrich Corporation, Charlotte, NC (US)

( * ) Notice: Subject to any disclaimer, the term of this patent is extended or adjusted under 35 U.S.C. 154(b) by 110 days.

(21) Appl. No.: 10/753,562

(22) Filed: Jan. 9, 2004

(65) Prior Publication Data

US 2004/0145842 A1     Jul. 29, 2004

(30) Foreign Application Priority Data

Jan. 9, 2003     (GB) ................................ 0300507.1

(51) Int. Cl.
  *H02H 3/16*     (2006.01)
  *H02H 3/28*     (2006.01)
(52) U.S. Cl. ............................ 361/42; 361/45; 361/46; 361/93.1; 361/93.5; 324/601; 324/74; 324/130
(58) Field of Classification Search ................. 361/42, 361/45, 46, 93.1, 93.5; 324/601, 74, 130
See application file for complete search history.

(56) References Cited

U.S. PATENT DOCUMENTS

| | | | |
|---|---|---|---|
| 4,550,360 A | | 10/1985 | Dougherty |
| 4,703,389 A | * | 10/1987 | Scott .......................... 361/93.3 |
| 5,539,602 A | * | 7/1996 | Schmitz et al. ................ 361/42 |
| 5,675,465 A | * | 10/1997 | Tanaka et al. ................. 361/42 |
| 5,963,457 A | * | 10/1999 | Kanoi et al. ................. 700/291 |
| 6,188,203 B1 | * | 2/2001 | Rice et al. ..................... 322/25 |
| 6,579,593 B1 | | 6/2003 | Mori et al. |
| 6,794,883 B2 | * | 9/2004 | Klingel ........................ 324/522 |

FOREIGN PATENT DOCUMENTS

DE     199 59 777 A1     6/2001

OTHER PUBLICATIONS

Search Report from co-pending European Application No. EP 04 25 0050 dated May 10, 2006.

* cited by examiner

*Primary Examiner*—Brian Sircus
*Assistant Examiner*—Zeev Kitov
(74) *Attorney, Agent, or Firm*—Wolf, Greenfield & Sacks, P.C.

(57) ABSTRACT

A ground fault detection system is provided where one current sensor is used to calibrate a second sensor in order to provide automatic zeroing of the difference measurement. The calibration is done gradually in order to differentiate between sensor drift and a transition in current due to a differential fault.

22 Claims, 4 Drawing Sheets

APPARATUS FOR AND METHOD OF GROUND FAULT DETECTION

The present invention relates to an apparatus for and method of ground fault detection.

A ground fault, which is the presence of an unwanted current path from a supply to ground, can be determined by detecting a difference between the current supplied from a power supply, such as a generator, and the current supplied to a load. Conventional methods for providing ground fault detection include monitoring the generator current and the load current with two shunts, with two current transformers or two hall effect devices each of which must be matched to one another so as to provide accurate detections. Even if the components are accurately matched, which generally requires the use of high cost sensing elements, imprecision may still occur due to thermal differences between the sensing elements thereby resulting in them becoming mismatched again. This may then lead to an indication of a ground fault by virtue of an apparent difference between the current supplied from the generator and the current supplied to the load even when no such difference exists.

U.S. Pat. No. 5,539,602 discloses a ground fault interrupter in which a first resistor R1 is used to measure the current flowing to a load and a second resistor R2 is used to measure the current flowing from the load. In a preferred embodiment R1 and R2 are equal, so forming the difference between the voltage drops across the resistors should result in a zero value in the absence of a ground fault. The presence of a ground fault is indicated by the difference value exceeding a threshold. In a second, briefly discussed variation, the resistors R1 and R2 can be different. In which case a specific non-zero value in the difference between the voltage drops is taken to be indicative that a ground fault does not exist. However, if the difference value differs from the non-zero value by more than a specific amount then a ground fault is signalled and the supply is disconnected. A major problem with this second embodiment is that it cannot tell the difference between voltage changes resulting from a ground fault and those resulting from a change in the current drawn by the load.

According to a first aspect of the present invention there is provided a ground fault protection system, comprising a first current measuring device for measuring current flow to a load; a second current measuring device for measuring current flow from a source of electrical power; and a controller arranged to compare current measurements from the first and second current measuring devices when there is no ground fault condition, to derive a relationship between the measurements and on the basis of the relationship to compare the current flow to the load and the current flow from the source of electrical power and to disconnect or de-energise the source of electrical power if the currents differ by more than a predetermined value.

It is thus possible to provide an apparatus which overcomes the problem of the prior art by enabling one of the current sensing elements to effectively calibrate the second. The calibration can be arbitrary in that the controller merely seeks to obtain a usable correlation between the two current measuring devices and only one of the sensors needs to be accurate in order to obtain an accurate difference.

The creation of a relationship between the responses of the first and second current measuring devices allows the respective outputs of the current measuring devices to be compared in a meaningful way even when the current drawn by the load changes. More specifically if a measurement of the responses of the current measuring devices is made when a first current is flowing, then the relationship allows the currents flowing through the measuring devices to be meaningfully compared when a second current, which may be significantly different from the first current, is flowing. Therefore this protection system can cope with changes in the load current flowing through the load.

Where the current sensing elements can be expected to be substantially linear in their response to a changing current, then the correlation or correction between the two current measurements can be performed by scaling one of the measurements with respect to the other such that they match. This is especially likely to work if the current measurements are made by monitoring the voltage dropped across an ohmic element as result of current flow therein.

The resistance of the or each ohmic element used for current measurement may vary and hence it may be necessary to calculate a revised resistance for the ohmic element, either continuously or on a periodic basis for use in the comparison of current flow. Provided that such recalculation of resistance is not applied instantaneously, but rather is a time varying contribution of the prevailing estimate of resistance together with historical estimates of resistance, the system is both able to continually recalibrate the sensors with respect to one another thereby eliminating the potential inaccuracies caused by temperature drift whilst still retaining good sensitivity to the presence of a ground fault.

The sensors need not merely be ohmic sensors, but other devices such as hall effect devices or current transformers can be used, and indeed mixed combinations of devices could be used such as the current shunt and a hall effect device provided that each device is reasonably well characterised such that a reasonable correlation between the currents as measured by each device can initially be established under no fault conditions. The controller can then determine a calibration correction which can be applied to the devices and updated from time to time.

According to a second aspect of the present invention there is provided a method of detecting a ground fault comprising the steps of measuring the first current supplied to a load, measuring a second current supplied from a generator, and on the assumption that no ground fault condition exists applying a correction, scaling or mapping function to the measurements so as to substantially equate the measurements, and then to compare subsequent measurements of the first and second currents and to indicate a fault condition if a difference between these measurements exceeds a predetermined value.

Preferably the correction, scaling or mapping function is updated with the passage of time. Advantageously, the correction value varies only slowly or in accordance with the time constant such that erroneous measurements, or measurements made in the presence of a ground fault condition do not perturb the method or apparatus before it is has the opportunity to signal that a fault condition exists.

One of the current sensors may be a winding of a generator.

The present invention will further be described, by way of example, with reference to the accompanying drawings in which:

FIG. 1 schematically illustrates a generator having a ground fault detection system constituting an embodiment of the present invention;

Figure 1:
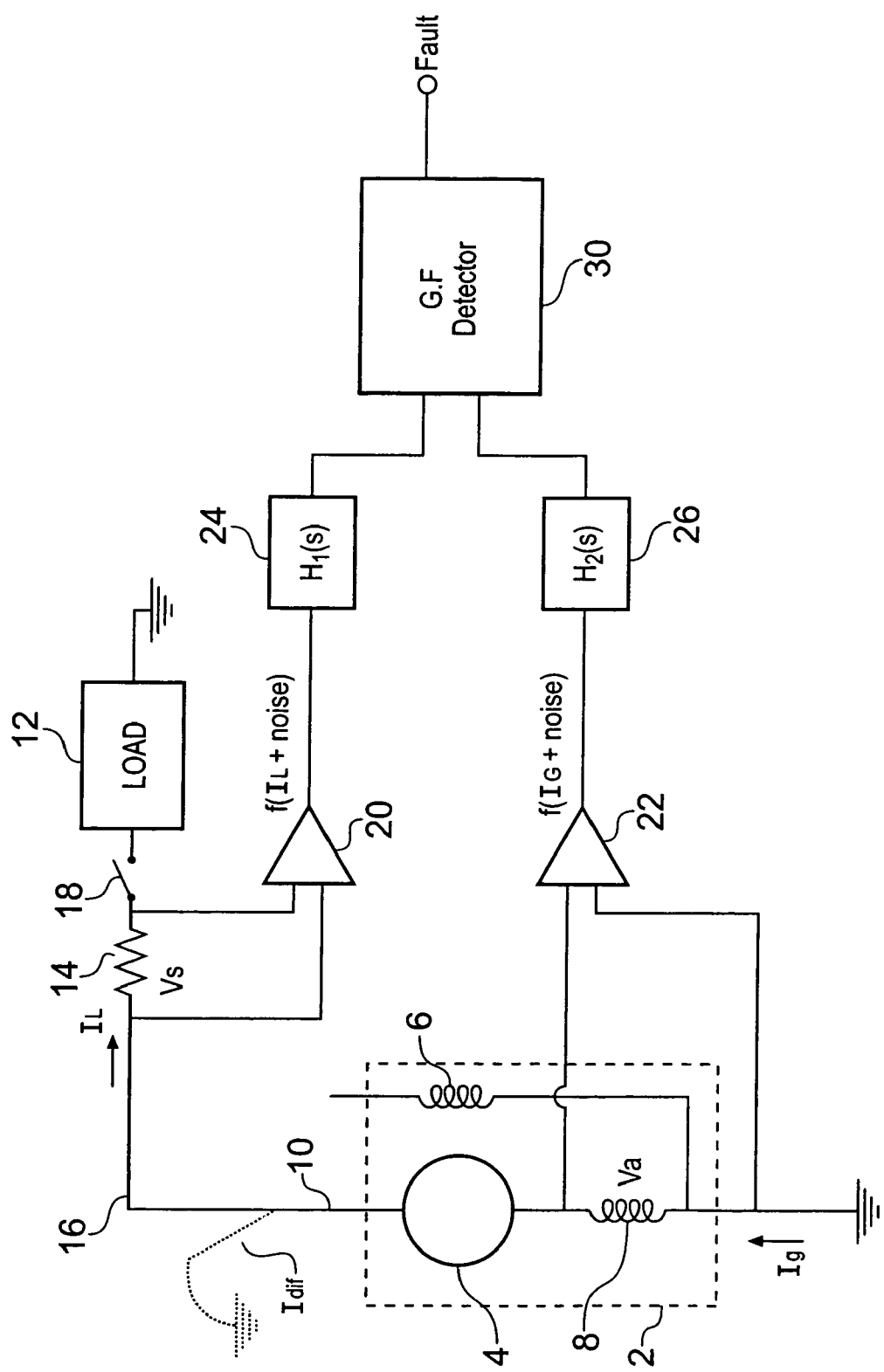

A typical starter generator system of the type found on aircraft is shown in FIG. 1. The generator 2 has a rotating armature 4 which is energised by a current flowing through a field winding 6 from a controller (not shown). The generator also includes an interpole winding 8 (also known as a compensating winding) whose purpose is to compensate for the change in phase that would otherwise occur between the magnetic flux and the generated current as the generator current increases. The provision of the interpole winding helps minimise the voltage induced into the conductors between the main poles. By minimising this voltage difference sparking and arcing within the generator is reduced and this results in improved commutation and lower brush temperatures. It will, however, be seen that the entirety of the generator current $I_g$ flows through the winding 8 and furthermore the generator is configured such that either end of the winding is accessible. Thus the current flow through the winding 8 will give rise to a voltage drop across the winding which is proportional to the generator current $I_g$. However, the resistance $R_a$ of the winding 8 will vary with the temperature of the winding and hence the resistance of the winding needs to be known at a given temperature before an accurate determination of the current flow therein can be made. An output 10 of generator 2 is connected to a load 12. A current shunt 14 is provided in the path to the load such that the load current $I_L$ can be determined.

Under some circumstances the contactor 18 which switches the generator load, may be 30 feet from the generator 10. Ground faults in the cable 16 between the generator 10 and the contactor 18 may cause shorts which could damage the airframe and/or the generator.

Ideally the generator current should equal the load current under all conditions. Any difference in current (Idif.) between the generator current, and the load current as sensed by current sensor 14, is indicative of a ground fault in cabling 16.

As noted hereinbefore, prior art ground fault detection arrangements have used matched current transformers in order to detect this out of balance current.

In the present invention the voltage $V_S$ occurring across the current shunt 14 is measured by a differential amplifier 20 at a time when there is assumed to be no ground fault. The output of the amplifier 20 is a function of current $I_L$ plus any noise occurring in the system at that time. The function is normally a simple scaling factor although other more complex functions may be provided for. Similarly, the voltage $V_a$ occurring across the generator interpole winding 8 is also measured at this time. This voltage is measured by a differential amplifier 22 and the output of the amplifier is a function of the generator current together with any noise that is present in the system. The outputs from the amplifiers 20 and 22 may advantageously be filtered by filters 24 and 26, respectively. The filter 24 and 26 may serve to remove high frequency noise, and may also serve to average out the voltage and the current measurements so that they become representative of the current flowing over a period of time rather than an instantaneous current measurement. The filters are substantially matched so as not to introduce any substantial phase error which may give rise to false detections. The filtered representations of the load current and the current flowing through the generator are then provided as inputs to a ground fault detector 30. It can be appreciated from FIG. 1 that the value of the ground fault current $I_{dif}=I_L-I_g$.

As previously stated current flowing in the generator can be determined by the voltage drop $V_a$ across the winding 8. However the resistance of the winding 8 is not measured directly but in fact is determined as the ratio of the voltage $V_a$ dropped across the generator winding 8 to the generator current thus $$R_a = \frac{V_a}{I_g}.$$

The voltage measurement $V_A$ is in fact filtered by a filter $H_2(s)$, although this could also be implemented in the digital domain and hence it follows that the above equation can be written as $$R_A = \frac{V_a H(z)}{I_g H(z)} = \frac{V_A}{I_G}.$$

The expression $$R_A = \frac{V_A}{I_G}$$

may be rewritten to make $I_G$ the subject and then substituted into the equation for $I_{dif}$ yielding $$I_{dif} = I_L - \frac{V_A}{R_A}$$

this can be further substituted using the filtered versions of $R_A$ such that $$I_{dif} = \frac{I_L V_A - V_a I_G}{V_A}$$

From the above equation it can be seen that a filtered variables $V_A$ and $I_G$ effectively provide a memory of the coil resistance $R_A$. These filtered values can then be used to deduce the coil resistance $R_A$ and hence, from the voltage drop across it, determine the generator current $I_G$. This effectively forms a system where the value of $R_A$ is continuously updated in a time period determined by the filter time constant. The measurements of $I_G$ and $I_L$ can then be compared periodically (separated by time periods which are shorter than the time constant of the filter). The action of such a system is that the measurement of the ground fault current will under no-fault conditions tend towards zero but any sudden change in the measured values of the generator current and the load current will result in the generation of a decaying estimate of the ground fault current. Provided that the decision time to trip the generator off is much shorter than the decay constant of the estimate of ground fault current then this system provides a reliable self-calibrating way of detecting ground fault current without requiring expensive matched sensors.

Thus, as noted before, the ground fault detector monitors the difference between the load current as measured by the shunt 14 and the voltage drop measured across the coil 8.

Figure 2:
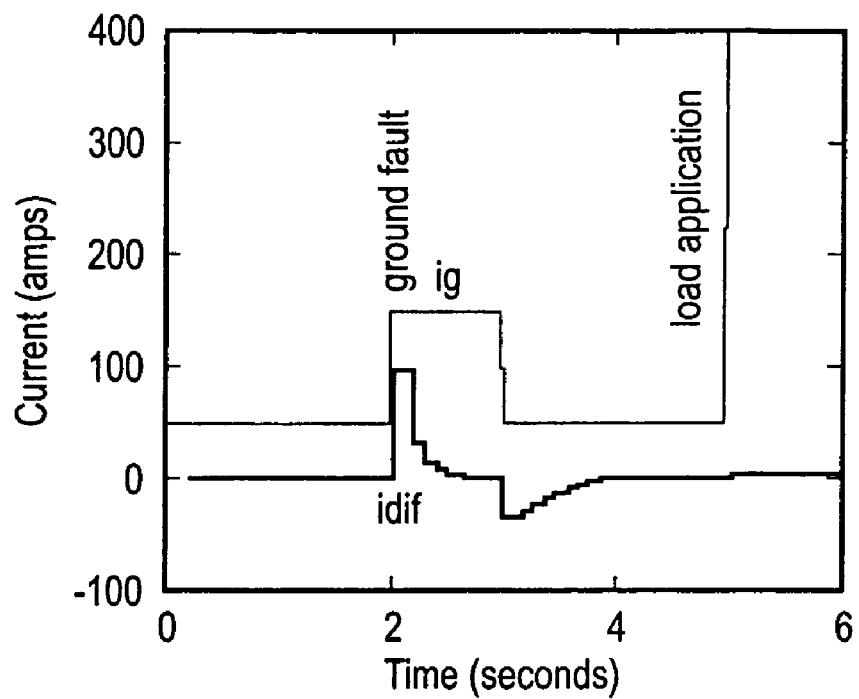
FIG. 2 is a graph showing the measurement of generator current with respect to time together with an estimate of the ground fault current $I_{dif}$ as derived by the ground fault detector shown in FIG. 1.
Figure 3:
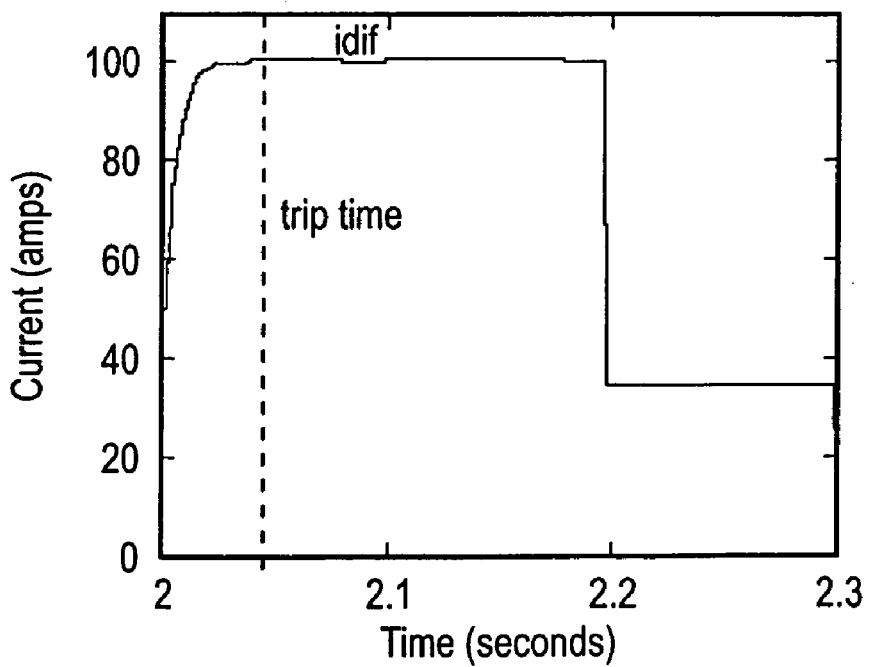
FIG. 3 shows an enlarged portion of FIG. 2 in the vicinity of the onset of a ground fault.

It is useful to consider the operation of the detector 30 under specific conditions. FIG. 2 shows an example in which the load current and the generator current are, at time zero, matched at 50 amps each. Under this condition, the ground fault detector implements the equation $$I_{dif} = \frac{I_L V_A - V_a I_G}{V_A}$$

and will therefore self-calibrate the resistance value of the coil 8 such that the measurement of $I_{dif}$ becomes zero. After two seconds, a ground fault is introduced such that a ground fault current of 100 amps flows in addition to the load current of 50 amps. Thus the total current rises to 150 amps. The ground fault detector using the historical measurements of $R_A$ immediately sees the 100 amp difference between the currents, as shown in greater detail in FIG. 3, and if this difference persists for more than a predetermined period, for example 50 ms, the ground fault detector issues a signal to trip the generator offline. However, if the generator is not tripped then the ground fault detector will seek to effectively recalibrate its value for $R_A$ such that the ground fault current $I_{dif}$ is returned to zero in accordance with a time period determined by the filters implemented within the ground fault detector. Thus, the detector 30 is only sensitive to changes in ground fault current rather than to the magnitude of the ground fault itself. Thus, as shown in FIG. 3, at time 3 seconds the detector shows the ground fault current as zero even though in reality a 100 amp ground fault current exists. If the ground fault is removed at time 3 seconds, then the ground fault detector once again starts to recalibrate itself in order that its measurement of the ground fault current returns to zero. At time T=5 seconds a large 400 amp load current is drawn from the generator, but since this current occurs equally in both detectors no ground fault error is indicated as, indeed, none exists.

It is thus possible to provide a measurement system which can use inexpensive current sensors, and indeed current sensors which exhibit significant amounts of thermal drift, by providing a system in which the measurement of the difference current is adapted such that it decays to zero over a time period which is large compared to the trip time of the generator.

A further advantage of the system described lies in providing a ground fault detection system in which one of the current sensors is a winding of the generator. Such a system is cheaper to implement and lighter in weight than a conventional system using two independent current sensors.

Figure 4:
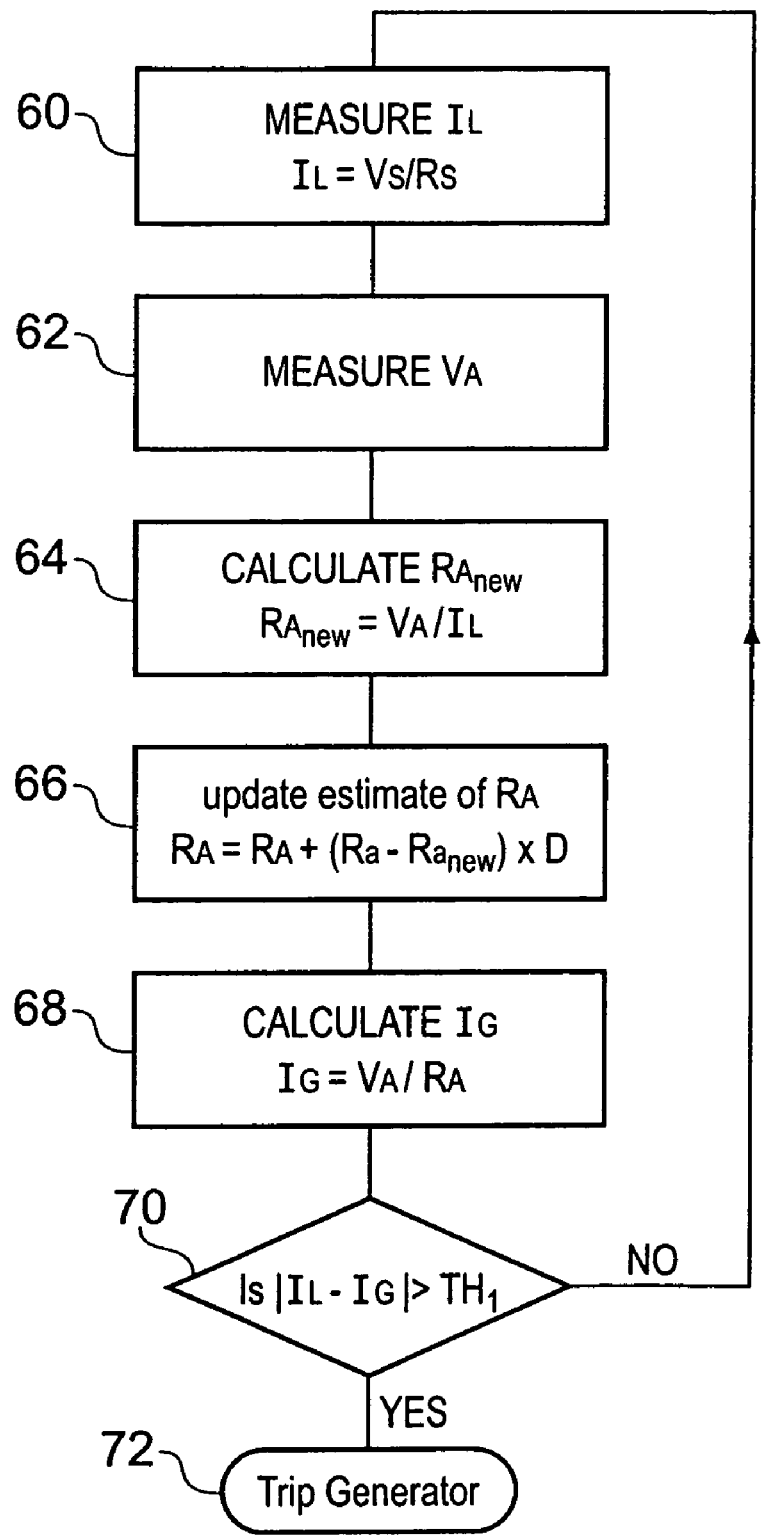
FIG. 4 is a flow chart of an implementation of the method of the present invention.

FIG. 4 illustrates a flow chart for the implementation of the ground fault detector within a programmable digital computer. Control commences at step 60 where a measurement of $I_L$ is made. The load current $I_L$ can be estimated since $$I_L = \frac{V_S}{R_S}$$

where $V_S$ is the voltage occurring across the shunt 14 and $R_S$ is the nominal shunt resistance. Control then passes to step 62 where a measurement is made of the voltage $V_A$. From step 62, control passes to step 64 where the coil resistance $R_{ANEW}$ is calculated on the assumption that no ground fault exists and hence $I_G = I_L$ and $$R_{ANEW} = \frac{V_A}{I_L}.$$

From step 64 control passes to step 66 where the new estimate $R_{Anew}$ of the coil resistance is used to update a pre-existing estimate $R_A$ of the coil resistance this is performed by adding the difference between the old and new estimates of the coil resistance, multiplied by a factor D which is less than unity to the pre-existing estimate of the coil resistance. This has the effect that each time the step is executed the coil resistance is modified slightly and in response to a step change would asymptote/decay towards a new value. From step 66 control is passed to step 68 where the generator current is calculated from $I_G$ is $$\frac{V_A}{R_A}.$$

Control then passes to step 70 where the modulus of the difference between the generator and load current is compared with the threshold TH1. If the difference is less than the threshold then control returns to step 60 whereas if the difference is more than the threshold then control passes to step 72 which causes the generator to be tripped offline.

It can be seen that the first current measuring device is used to estimate the load current $I_L$ at a first time instant, and that this value is then used in the calculation of the impedence of the second current measuring device, and that this assumed impedence can then be used in conjunction with the measurement of voltage across the second current measuring device to estimate the current flowing through it. Thus a relationship is established between the measuring devices which enables their responses to any arbitrary current flow to be predicted, and hence differences exceeding the predicted differences between the current measuring device responses are indicative of a ground fault.

The continual updating of the relationship between the current measuring devices allows thermal and ageing effects to be accounted for.

Figure 5:
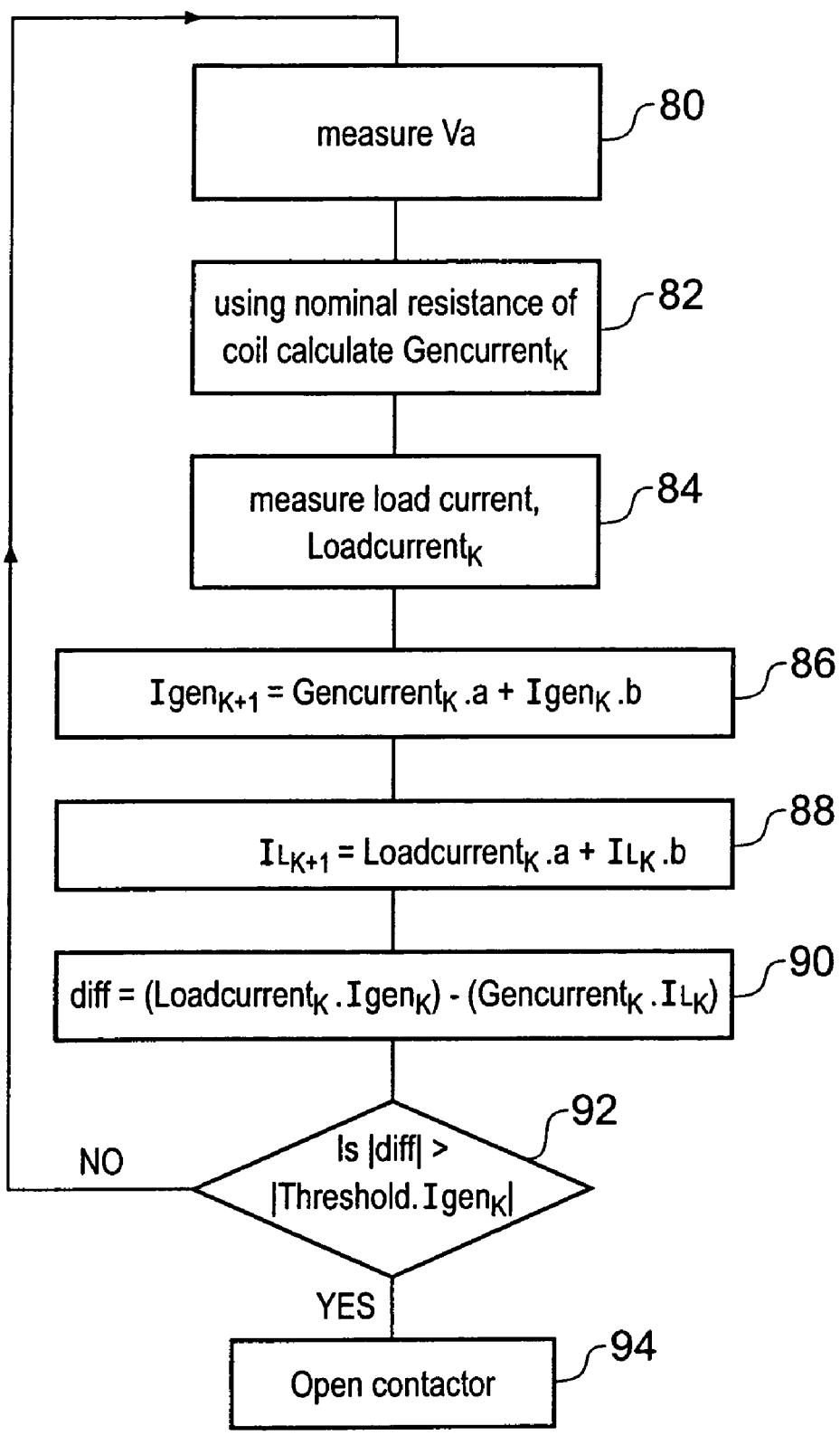
FIG. 5 is a flow chart of a further method of implementing the present invention.

FIG. 5 shows a further flow chart for implementing a further embodiment of the present invention. This further embodiment avoids the use of a division operator and hence places less demand upon a data processor.

The process starts at step 80 where the voltage Va across the winding 8 is measured. The generator current "Gencurrent$_K$" for the Kth measurement is determined at step 82 by applying a scaling factor to the measurement of Va. Control is then passed to step 84 where the load current "Loadcurrent$_K$" is measured (for example by measuring the voltage across a shunt or by using some other current sensor).

Next, at step 86, a filtered version of generator current Igen$_{K+1}$ for the next measurement/comparison cycle is calculated. Thus Igen$_{K+1}$ is calculated as:

$$Igen_{K+1} = Gencurrent_K \cdot a + Igen_K \cdot b$$

Where a and b are constants and generally but not necessarily a+b=1

This gives rise to a slowly varying estimate of generator current based on a combination of present and historical values.

From step 86 control is passed to step 88 where a similar process is performed to estimate the load current $IL_{K+1}$ for the next measurement/comparison cycle. Thus $IL_{K+1}$ is calculated as:

$$IL_{K+1} = \text{Loadcurrent}_K \cdot a + IL_K \cdot b$$

Where a and b are constants and generally but not necessarily a+b=1.

From step 88 control is passed to step 90 where a difference "diff" in current is calculated as $$\text{diff} = (\text{Loadcurrent}_K \cdot \text{Igen}_K) - (\text{Gencurrent}_K \cdot IL_K)$$

From step 90, control is passed to step 92 where the magnitude of diff is compared with the magnitude of a threshold value multiplied by $\text{Igen}_K$, and if diff is bigger than the threshold value multiplied by $\text{Igen}_K$, then control is passed to step 94 where a signal is asserted to open a contactor to take the generator off line, otherwise control is returned to step 80. The cycle is repeated with the next set of measurements.

The invention claimed is:

1. A ground fault protection system, comprising:
   a first current measuring device for measuring current flow to a load;
   a second current measuring device for measuring current flow from a source of electrical power; and
   a controller arranged to compare measurements from the first and second current measuring devices when there is no ground fault condition; to derive a relationship between the measurements such that the first current measuring device is used to calibrate the second measuring device; to repeat the comparison of measurements and to update the relationship; and on the basis of the relationship to compare the current flow to the load and the current flow from the source of electrical power and to disconnect or de-energize the source of electrical power if the currents differ by more than a predetermined value.

2. A ground fault protection system as claimed in claim 1, wherein the source of electrical power is a generator and the second current measuring device is a winding within the generator.

3. A ground fault protection system as claimed in claim 2, wherein the winding within the generator is an interpole winding.

4. A ground fault protection system as claimed in claim 2, wherein the controller estimates the resistance of the winding.

5. A ground fault protection system as claimed in claim 2, wherein the controller measures the voltage occurring across the winding.

6. A ground fault protection system as claimed in claim 1, in which the outputs of the first and second current measuring devices are filtered.

7. A ground fault protection system as claimed in claim 1, in which the controller applies a time varying correction to a measurement of current difference such that under no fault conditions the measurement of current difference tends to approach a reference value.

8. A ground fault protection system as claimed in claim 7, in which a ground fault is indicated when the measurement of current difference differs from the reference value by more than a first threshold.

9. A ground fault protection system as claimed in claim 1, in which the relationship derived when a first current is flowing allows the current measuring devices to be used to compare current flow at values different to the first current.

10. A ground fault protection system as claimed in claim 1, in which the first and second current measuring devices have dissimilar impedances.

11. An aircraft including a ground fault protection system as claimed in claim 1.

12. A method of providing ground fault protection, comprising the steps of:
    using a first current measuring device to measure a first current supplied to a load;
    using a second current measuring device to measure a second current supplied from a generator;
    on the assumption that no ground fault condition exists, applying a correction, scaling or mapping function to the measurements so as to derive a relationship between the measurements such that the first current measuring device is used to calibrate the second current measuring device, periodically updating the function equating the measurements and comparing the measurements of the first and second currents and indicating a fault condition if the difference exceeds a predetermined value.

13. A method as claimed in claim 12, in which the correction, scaling or mapping varies as a function of time so as to maintain the current measurements in substantial equally.

14. A method as claimed in claim 13, in which the variation has a time constant such that short term differences are detectable as a fault condition.

15. A ground fault protection system, comprising:
    a first current measuring device for measuring current flow to a load;
    a second current measuring device for measuring current flow from a source of electrical power; and
    a controller arranged to compare measurements from the first and second current measuring devices when there is no ground fault condition; to derive a relationship between the measurements; and on the basis of the relationship to compare the current flow to the load and the current flow from the source of electrical power and to disconnect or de-energize the source of electrical power if the currents differ by more than a predetermined value, wherein the source of electrical power is a generator and the second current measuring device is a winding within the generator and the controller estimates the resistance of the winding.

16. A ground fault detection system as claimed in claim 15, wherein the first current measuring device is used to calibrate the second measuring device.

17. A ground fault protection system as claimed in claim 15, wherein the winding within the generator is an interpole winding.

18. A ground fault protection system as claimed in claim 15, wherein the controller measures the voltage occurring across the winding.

19. A ground fault protection system as claimed in claim 15, in which the controller applies a time varying correction to a measurement of current difference such that under no fault conditions the measurement of current difference tends to approach a reference value.

20. A ground fault protection system as claimed in claim 15, in which the relationship derived when a first current is flowing allows the current measuring devices to be used to compare current flow at values different to the first current.

21. A ground fault protection system as claimed in claim 15, in which the first and second current measuring devices have dissimilar impedances.

22. An aircraft including a ground fault protection system as claimed in claim 15.

* * * * *